US008762978B2

(12) United States Patent
Mountain et al.

(10) Patent No.: US 8,762,978 B2
(45) Date of Patent: Jun. 24, 2014

(54) CONTENT RECEIVER HAVING A LOW-POWER MODE

(75) Inventors: Dale Llewelyn Mountain, Keighley (GB); Jonathan A. Capless, Bradford (GB)

(73) Assignee: Eldon Technology Limited, Steeton, Keighley (GB)

( * ) Notice: Subject to any disclaimer, the term of this patent is extended or adjusted under 35 U.S.C. 154(b) by 996 days.

(21) Appl. No.: 12/638,804

(22) Filed: Dec. 15, 2009

(65) Prior Publication Data

US 2011/0145808 A1    Jun. 16, 2011

(51) Int. Cl.
*G06F 9/44* (2006.01)

(52) U.S. Cl.
USPC .......................................... 717/168; 717/172

(58) Field of Classification Search
None
See application file for complete search history.

(56) References Cited

U.S. PATENT DOCUMENTS

| 6,049,823 A * | 4/2000 | Hwang ............................ 725/82 |
| 2006/0036757 A1 * | 2/2006 | Na et al. ......................... 709/231 |

* cited by examiner

*Primary Examiner* — Qamrun Nahar
(74) *Attorney, Agent, or Firm* — Seed IP Law Group PLLC

(57) ABSTRACT

A method, system and apparatus for interacting with scheduling data and primary data. A content receiver may receive scheduling data and extract, from the scheduling data, a time at which primary data is available. The content receiver may enter a de-powered state until the time, at which point it powers up. The content receiver may receive the primary data at the time and process it as necessary. Following processing, the content receiver may again power down.

19 Claims, 3 Drawing Sheets

CONTENT RECEIVER HAVING A LOW-POWER MODE

TECHNICAL FIELD

Embodiments described herein generally relate to content receivers, such as set-top boxes, and more particularly to content receivers having a low-power mode achieved when the receiver is not otherwise operating.

SUMMARY

One embodiment takes the form of a method for receiving primary data, including the operations of receiving, at a content receiver, scheduling data determining, from the scheduling data, at least a time at which primary data is available; deactivating the content receiver; based on the time, activating the content receiver; and at the time, receiving the primary data.

Another embodiment takes the form of an apparatus for receiving content, scheduling data and primary data, including: a primary processor; a memory coupled to the primary processor; reception hardware coupled to the primary processor, the reception hardware operative to receive a signal across a network, the signal including at least scheduling data; and a secondary processor operative to adjust a power state of the reception hardware and primary processor based on the scheduling data.

Still another embodiment takes the form of a system for providing primary data to a content receiver, comprising: a content provider; a network linking the content provider to the content receiver; wherein the content provider is operative to schedule a transmission across the network, the transmission containing at least scheduling data including a download schedule; and the content provider is further operative to schedule a second transmission across the network, the second transmission occurring at a time specified on the download schedule and containing primary data.

DETAILED DESCRIPTION

Figure 1:
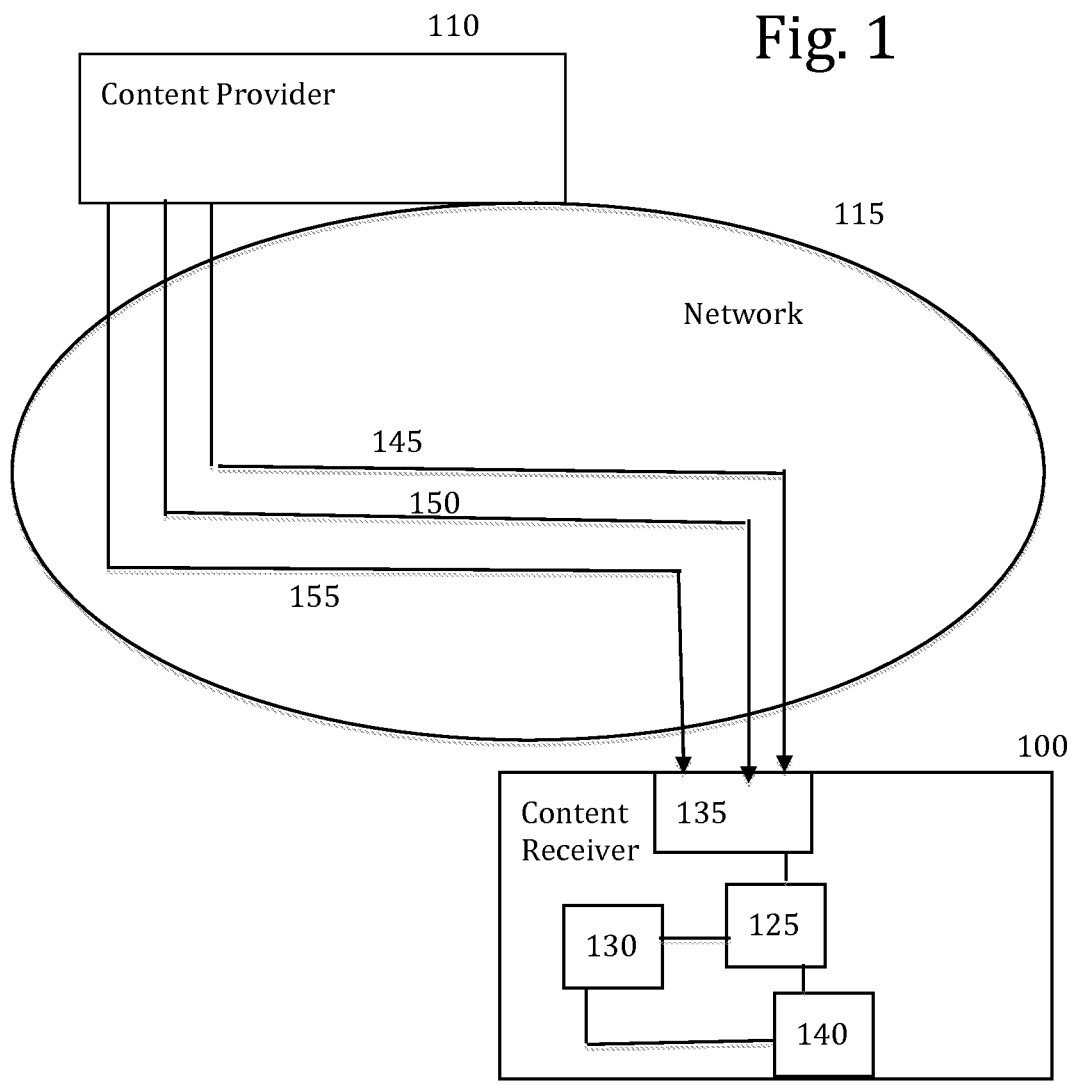
FIG. 1 depicts a sample embodiment in a sample operating environment.

Generally, embodiments described herein relate to electronic devices capable of receiving audio, video, and/or audiovisual content across a network. Typically, such electronic devices may be turned on or off in order to conserve power. However, even when an electronic device is in an "off" state, several (or potentially most, or even all) functions may continue to draw power through their respective hardware elements. As one example, certain electronic devices may maintain power to receiving elements so that schedule information, software updates and the like may be received when transmitted across a network. Thus, although the electronic device may be placed into standby, in this example at least the receiving elements constantly draw power in order to maintain the functionality to receive transmissions.

Certain embodiments discussed herein may intelligently wake (e.g., power up) hardware to perform specific functions only when such operations are scheduled. To continue the foregoing example, the electronic device may maintain power to a microprocessor that maintains a download schedule. The download schedule may be periodically transmitted by a content provider and may indicate when certain transmissions contain data to be downloaded by the device. During non-download times, the majority of the electronic device may be in a powered-down state. Likewise, certain receiving devices associated with the electronic device may be powered down and under the control of the device.

As a download time approaches or occurs, the microprocessor may, based on the download schedule, wake the electronic device (and any external receiving device with which it is in communication) in order to receive and process the downloaded data. In certain embodiments, the microprocessor may wake the entire electronic device and a receiving device associated therewith. In one example, the receiving device may be a low noise block converter (LNC).

In other embodiments, the microprocessor may wake only receiving elements and/or those elements necessary to perform the receiving function. In certain embodiments, the content receiver may be a set-top box and the microprocessor may control limited functions of the set-top box, such as a front panel display.

The term "electronic device," as used herein, generally refers to a device that may receive and process data (such as the aforementioned audiovisual content) that is transmitted across a network. Typical electronic devices include set-top boxes configured to operate with a satellite system, cable boxes, televisions, appropriately-configured computing devices and so on. The term "content receiver" or "receiver" may be used interchangeably with "electronic device."

Likewise, a "network" as used herein generally refers to any transmission medium connected to an electronic device and across which the device may receive data. Sample networks include, but are not limited to, satellite systems, cable systems, terrestrial broadcasts, wireless networks, a telephone system (such as the "plain old telephone service" system), other wired networks (including the electrical wiring of a building in conjunction with appropriate technology, such as a HomePlug network), the Internet, other wired networks and so on.

FIG. 1 depicts a sample embodiment in a sample operating environment. A content receiver 100 is connected to a content provider 110 by a network 115. In the example shown in FIG. 1, the network 115 is a satellite network; the content provider and receiver are ultimately connected to one or more satellites relaying content (and other data) from provider to receiver. Each content receiver 100 may include a primary processor 125, a secondary processor 130, reception hardware 135 and/or a memory 140. Receivers 100 may have additional components or hardware, such as decoders, storage devices, transcoders, demodulation circuitry and so forth. Insofar as the standard makeup and operation of a receiver, such as the set-top box shown in FIG. 1, is well known, neither are discussed herein.

Generally, signals transmitted across the network 115 carry various types of data and are received by the reception hardware 135. The data may be any type of content 145, including those previously mentioned. The data may also include metadata regarding the content, electronic programming guide (EPG) information, status information, operating system and/or other software updates and so forth. In the present embodiment, scheduling data 150 may also be transmitted across the network to a receiver 100. Scheduling data may be transmitted concurrently with other types of data or may be transmitted separately.

"Scheduling data," within the parlance of this document, refers to data indicating a time, date, or other reference point at which some other information (called "primary data" herein) is available for receipt by the content receiver 100. Scheduling data 150 may be absolute (for example, a particular date and time) or relative (for example, a certain time after a particular event occurs). As one example, scheduling data may indicate that primary data 155 is available to a receiver at 2:30 AM, local time for the receiver, on Jul. 12, 2009. As another example, the scheduling data may indicate that primary data is to be transmitted to the receiver thirty days after the last primary data transmission. It should be appreciated that the first example provides absolute scheduling data, while the second example provides relative scheduling data. It should also be appreciated that the relative scheduling data may be based on any event, such as the receipt of a particular type of content (e.g., a program), an operation of the receiver 100 (e.g., after the receiver has been turned on 20 times), in response to a user input (e.g., a user's indication that primary data is desired), and so on.

With respect to FIG. 1, the interplay of scheduling data, primary data and the content receiver 100 will be explored in more detail. As previously mentioned, the content receiver 100 receives data transmitted across a network 115 from a content provider 110. In the present example, the network is a satellite system and the content provider is a satellite provider.

Received data may include content 145, scheduling data 150 and/or primary data 155. The scheduling data and/or primary data may be transmitted concurrently with received data or may be transmitted separately. Further, the scheduling and/or primary data may be transmitted on the same transponder as primary data or on a different transponder. As one example, scheduling data may be placed in a transmission stream having bandwidth not fully consumed by content.

As scheduling data 150 is received at the content receiver 100, it is processed by either the primary processor 125 and/or secondary processor 130. The primary and/or secondary processor may retrieve, from the scheduling data, a type of primary data related thereto and a designated time at which the primary data will be available to the receiver. It should be noted that the primary data may be transmitted to or downloaded by the receiver at the designated time; the exact implementation for providing primary data to the receiver 100 may vary by embodiment. Typically, the designated time indicated by, or included in, the scheduling data 150 occurs some time after the scheduling data is received.

The content receiver 100 may power down some or all hardware and/or operations once the scheduling data 150 is received and processed. In certain embodiments, the content receiver 100 may also power down external devices used to receive and/or process a transmission. As one example, if the content receiver is a set-top box for use with a satellite system, it may power down a low noise block converter (LNC) associated with the set-top box. The set-top box may power down the LNC through an electrical connection therebetween. Appropriate software, hardware or firmware may be included in the set-top box to permit such control of the LNC.

Typically, the secondary processor 130 remains powered on and active. The secondary processor 130 may be, for example, a microprocessor and may be more power-efficient (and/or draw less power) than the primary processor 125. At the designated time or slightly before, the secondary processor 130 may wake the receiver 100, portions thereof, and/or any external devices to permit download of the primary data 155. Once the primary data is received, it may be processed as necessary and, after processing, the receiver and/or external devices may return to a powered-down or inactive mode. In certain embodiments, the secondary processor 130 remains powered on after processing of the primary data.

An example may assist in understanding the operation of the embodiment in question. With respect to FIG. 2, presume a set-top box 200 receives transmissions across a satellite network 205 from a content provider 210. The content provider transmits scheduling data 215 to the set-top box at a time T1. As previously mentioned, the scheduling data may be transmitted concurrently with, or as part of, other content or may be transmitted separately.

The scheduling data indicates that certain primary data 225 will be available to the set-top box 200 at a time T4. Presuming the set-top box is not otherwise in use, at a time T2, the set-top box and associated LNC 220 generally power down, leaving only the set-top box's microprocessor active. Here, time T2 occurs very shortly after time T1.

Figure 2:
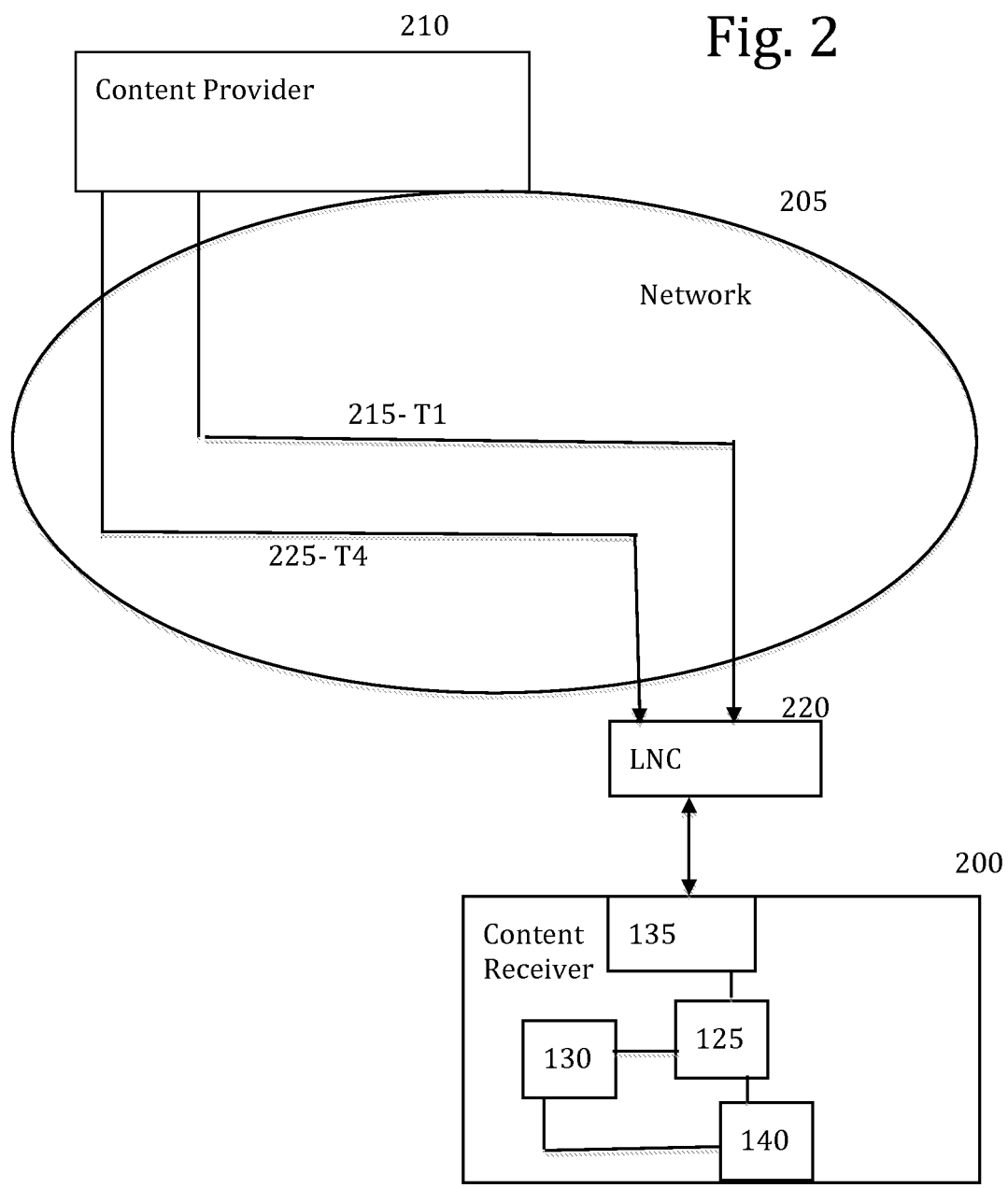
FIG. 2 depicts a sample timing of transmissions.

Still continuing the example of FIG. 2, the microprocessor wakes the set-top box 200 and associated LNC 220 at time T3, which is slightly before time T4 (e.g., the designated time in this example). Accordingly, the set-top box is active and able to receive the primary data across the network 205 from the provider 210 at time T4, as scheduled. The set-top box may return to a powered-down state after the primary data is received and/or processed.

It should be appreciated that the time between T3 and T4 may be measured in minutes, seconds, or fractions of a second. The same is true for the delta between T1 and T2. The exact time differences may vary by embodiment.

Conceivably, a content receiver 100 may awake, power up, or otherwise engage certain functionality at a designated time to receive primary data 155, only to be unable to receive primary data at that time. For example, a network error may prevent primary data from being downloaded to the receiver, or the primary data transmission time may have been rescheduled. In the case of a rescheduling, the receiver 100 may not be aware of the rescheduling, insofar as any data transmission indicating the rescheduling may be sent after receipt and processing of scheduling data by the receiver but before the designated time, and thus occur while the receiver 100 is asleep. Accordingly, the receiver 100 may determine once the designated time has passed, or at a certain time after the designated time, that the primary data is unavailable. In such a case, the receiver may await new scheduling data indicating a new designated time for the receipt of primary data. In alternative embodiments, the receiver 100 may actively request new scheduling data from the provider or network operator.

The nature of the primary data may vary widely. Primary data may be, for example, a software update. Alternatively, it may be a particular type of content such as a pay-per-view program. As still another option, the primary data may be advertisements to be stored locally at the receiver 100.

In certain embodiments, the content receiver 100 may report to the content provider that primary data was or was not received. For example, a backchannel between the receiver and content provider may be provided to carry such communications. In other embodiments, the content receiver may communicate across the network 115 with the content provider 110. In the event the content provider is informed that the content receiver did not receive the primary data, the provider may prepare and transmit new scheduling data indicating a new time at which the primary data may be transmitted or otherwise made available.

Figure 3:
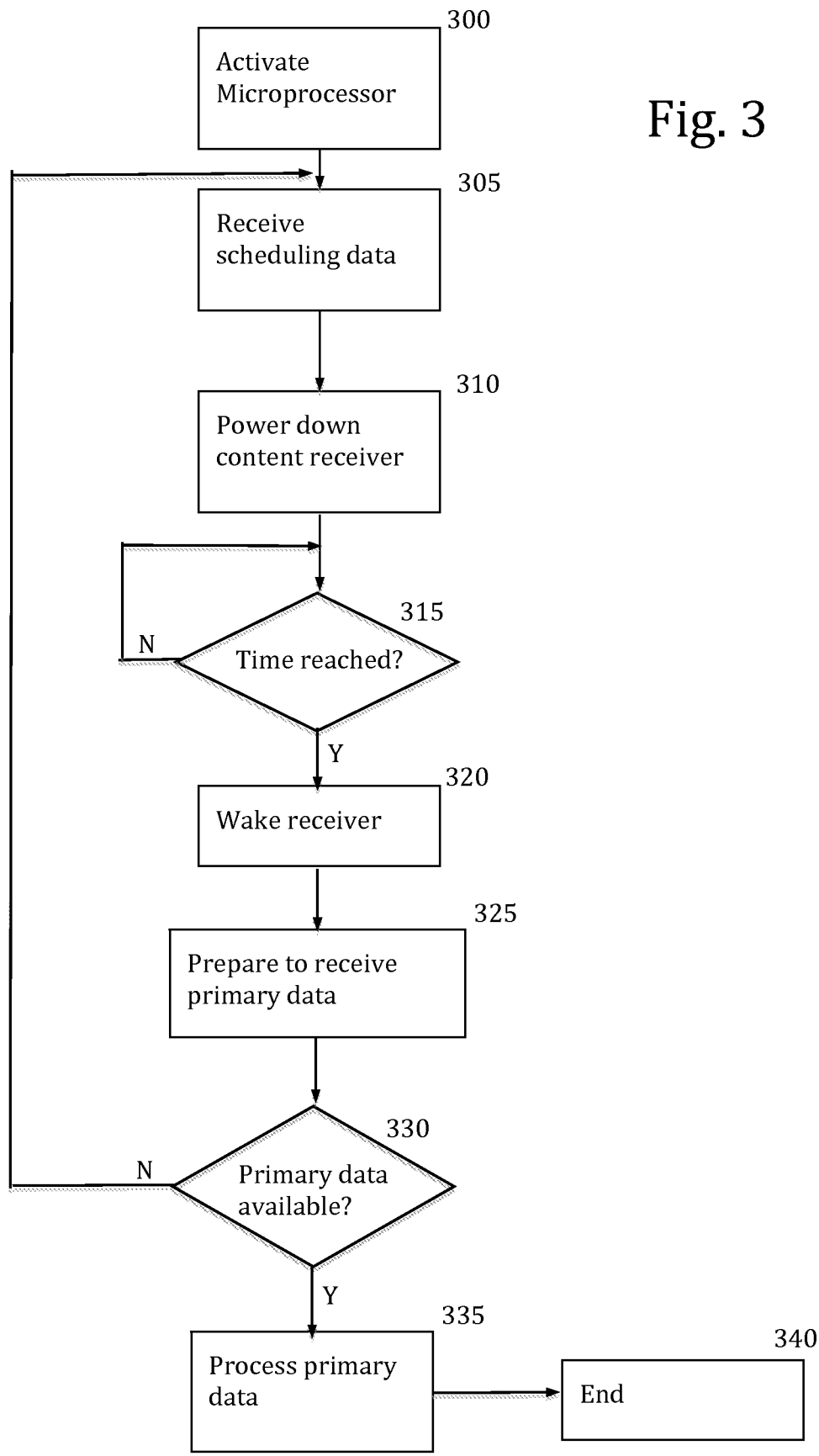
FIG. 3 is a flowchart showing sample operations that may be executed by a sample embodiment, such as that of FIG. 2.

FIG. 3 is a flowchart detailing operations that may be carried out by a sample embodiment in order to receive and process scheduling data, as well as to receive primary data the method begins in operation 300, in which a content receiver 100 (and any associated external device) is activated or otherwise enters a receptive state. This may occur, for example, when a set-top box or other content receiver, as well as an associated LNC, is powered on.

In operation 305, the content receiver 100 receives scheduling data 130. The scheduling data typically includes temporal coordinates (such as a time and/or date) and system information (such as a particular channel, packet identifier, data stream and so on) at which primary data 155 will be available. Once received, the scheduling data may be processed and the temporal coordinates stored in the receiver memory 140 and/or maintained by the secondary processor 130.

In operation 310, the receiver 100 is powered down, optionally as is the external device. Typically, the secondary processor 130 will maintain a powered-on state in and after 310. In this manner, the secondary processor may wake the remainder of the receiver and, optionally, the external device when necessary (such as in operation 320). Accordingly, in many embodiments the execution of operation 310 results in a partially or mostly powered-down receiver.

In operation 315, the receiver 100 determines if the time (e.g., temporal coordinates) have been reached. If not, the embodiment continues to execute operation 315 until the proper time has been reached. The "time" to be reached in operation 315 may be slightly before the temporal coordinates specified in the scheduling data 150, in order to provide sufficient time for operations 320 and 325 to be executed.

Once the time has been reached, the content receiver 100 wakes in operation 320. Should the receiver have powered down an external device in operation 310, it may now wake that device. Typically, the secondary processor 130 wakes the rest of the receiver, such as the primary processor and any transmission reception elements, and the optional external device. Following operation 320, the receiver prepares to receive the primary data 155 in operation 325.

As part of operation 325, for example, the content receiver 100 may configure itself to receive a specific frequency, transponder, digital data stream and so on. The content receiver 100 may also activate or power on a storage device such as a magnetic storage medium.

In operation 330, the content receiver 100 determines if the primary data 155 is available. If so, it is received and processed in operation 335 (described below). If not, the embodiment returns to operation 305 and awaits new scheduling data 150 relating to the primary data 155.

In operation 335, primary data is processed. This may include, for example, updating software, firmware, an operating system, or other control elements of the content receiver 100. In certain embodiments, the primary data may be stored on a storage medium (or in the memory) as part of this operation. Following operation 335, the process terminates in end state 340. In certain embodiments, the content receiver 310 and/or external device may be again powered down in end state 340.

Although the foregoing has been described with respect to particular embodiments, systems, apparatuses and processes, it should be apparent to those of ordinary skill that alternative embodiments may vary any of the foregoing. Accordingly, the proper scope of protection is set forth in the appended claims.

We claim:

1. A method for receiving primary data, comprising:
receiving, at a content receiver, scheduling data, the scheduling data indicating at least a designated time, the designated time being a reference point at which primary data is scheduled to be available for receipt by the content receiver;
determining, from the scheduling data, at least the designated time at which the primary data is scheduled to be available;
subsequent to the scheduling data being received, deactivating the content receiver and at least one external device coupled to the content receiver, the external device facilitating receipt of at least the primary data;
based on the determined designated time, activating the content receiver and the at least one external device; and
at the designated time, receiving the primary data, if available.

2. The method of claim 1, further comprising:
updating an operating system of the content receiver based on the received primary data.

3. The method of claim 1, further comprising:
after receiving the primary data, deactivating the content receiver, wherein deactivating the content receiver includes powering down at least a primary processor in the content receiver.

4. The method of claim 3, further comprising:
determining that the primary data is not received; and
if the primary date is not received, requesting new scheduling data.

5. The method of claim 3, wherein:
the content receiver is a set-top box; and
the at least one external device is a low noise block converter.

6. The method of claim 1, wherein deactivating the content receiver comprises:
powering down at least a primary processor and a reception hardware; and
maintaining power to a secondary processor, and wherein activating the content receiver comprises:
powering up at least the primary processor and the reception hardware.

7. The method of claim 1, further comprising:
separating scheduling data from content.

8. An apparatus, comprising:
a primary processor;
a memory coupled to the primary processor;
a reception hardware coupled to the primary processor, the reception hardware operative to receive a signal across a network, the signal including at least scheduling data indicating at least a designated time, the designated time being a reference point at which primary data is scheduled to be available for reception by the reception hardware; and
a secondary processor operative to adjust a power state of the reception hardware and the primary processor based on the designated time indicated in the scheduling data;
wherein the secondary processor is operative to adjust the power state of the reception hardware and the primary processor in order to receive primary data, the power state being one of power up and power down;
wherein based on the designated time, the secondary processor powers up the primary processor and the reception hardware in order to receive primary data, wherein subsequent to the scheduling data being received, the secondary processor being configured to power down the primary processor and the reception hardware.

9. The apparatus of claim 8, wherein:
the reception hardware is operative to receive the primary data based on a designated time specified by the scheduling data.

10. The apparatus of claim 9, further comprising:
a storage medium operatively coupled to the primary processor; wherein
the storage medium is operative to store the primary data.

11. The apparatus of claim 8, wherein the secondary processor is a microprocessor.

12. The apparatus of claim 11, wherein:
the secondary processor is further configured to adjust a power state of an external device coupled to the apparatus, and wherein
the power state being one of power up and power down.

13. A system for providing primary data to a content receiver, comprising:
a content provider having an electronic processor and an output coupling to a network, the content provider configured to:
schedule a first transmission and a second transmission, the first transmission for transmitting a scheduling data and the second transmission for transmitting a primary data,
select a first transponder for the first transmission,
select a second transponder for the second transmission,
at the scheduled first transmission, place the scheduling data on the selected first transponder for transmission on the network to the content receiver, the scheduling data including a designated time indicating when primary data is scheduled to be available, subsequent to the scheduling data being received, deactivating the content receiver and the second transponder coupled to the content receiver, the second transponder facilitating receipt of at least the primary date, and
at the scheduled second transmission, activate the content receiver and the second transponder and place the primary data on the selected second transponder for transmission on the network to the content receiver; the scheduled second transmission being at the designated time indicated in the scheduling data; and
the network coupled to the content provider and to the content receiver, the network configured to carry transmissions from the content provider to the content receiver.

14. The system of claim 13, wherein the scheduling data is transmitted simultaneously with at least one of a group consisting of content, an electronic programming guide, and content metadata.

15. The system of claim 13, wherein:
the content provider is further operative to receive an indication from the content receiver that the second transmission was not received; and
upon receiving the indication, the content provider is further operative to schedule a third transmission across the network, the third transmission containing a second download schedule.

16. The system of claim 13, wherein:
the network is a satellite network;
the content provider is a satellite television provider; and
the content receiver is a set-top box.

17. The system of claim 16, wherein the primary data is a software update for the content receiver.

18. The system of claim 13, wherein the scheduling data specifies a first time at which primary data is scheduled to be available and a second time at which primary data is scheduled to be available.

19. The system of claim 13, wherein the scheduling data is transmitted at intervals across the network.

* * * * *